(12) United States Patent
Thomasson

(10) Patent No.: US 9,997,035 B1
(45) Date of Patent: Jun. 12, 2018

(54) ACOUSTIC SECURITY SYSTEM AND METHOD

(71) Applicant: Samuel L. Thomasson, Gilbert, AZ (US)

(72) Inventor: Samuel L. Thomasson, Gilbert, AZ (US)

( * ) Notice: Subject to any disclaimer, the term of this patent is extended or adjusted under 35 U.S.C. 154(b) by 0 days. days.

(21) Appl. No.: 15/446,135

(22) Filed: Mar. 1, 2017

(51) Int. Cl.
| G08B 13/00 | (2006.01) |
| G08B 13/16 | (2006.01) |
| G01S 5/18 | (2006.01) |

(52) U.S. Cl.
CPC ............ *G08B 13/1672* (2013.01); *G01S 5/18* (2013.01)

(58) Field of Classification Search
CPC ............................... G08B 13/1672; G01S 5/18
See application file for complete search history.

(56) References Cited

U.S. PATENT DOCUMENTS

| 3,754,222 A | 8/1973 | Eisenberg |
| 4,003,045 A | 1/1977 | Stockdale |
| 4,097,853 A | 6/1978 | Francis, Jr. |
| 4,129,856 A | 12/1978 | Humphries |
| 5,828,626 A | 10/1998 | Castile et al. |
| 6,631,096 B2 | 10/2003 | Gillis et al. |
| 7,535,351 B2 | 5/2009 | Reymond |
| 8,797,407 B2 | 8/2014 | Lee et al. |
| 9,641,363 B2* | 5/2017 | Lea .................... H04L 27/00 |
| 2004/0022393 A1* | 2/2004 | Jones ................... H04R 3/00 381/56 |
| 2012/0087211 A1 | 4/2012 | Lee |
| 2015/0081071 A1* | 3/2015 | Lea .................... H04L 27/00 700/94 |

* cited by examiner

*Primary Examiner* — Erin M File
(74) *Attorney, Agent, or Firm* — Cahill Glazer PLC

(57) ABSTRACT

A security system includes a transducer within a monitored space responsive to audio signals therein. An analog-to-digital converter couples the transducer to the input of a digital signal processor. Time-staggered digital samples are stored, and are each multiplied by the current sample in a corresponding series of multipliers, and accumulated in a like series of accumulators. Accumulated sums, generated by the series of accumulators during known, undisturbed periods, are stored. During active monitoring, the processor compares currently generated accumulated sums to the previously stored accumulated sums generated during undisturbed periods. The processor creates an alarm signal when current values for the accumulated sums do not correspond to accumulated sums previously stored during undisturbed periods.

16 Claims, 5 Drawing Sheets

ACOUSTIC SECURITY SYSTEM AND METHOD

BACKGROUND OF THE INVENTION

Technical Field

This invention relates generally to apparatus and methods for detecting disturbances within a monitored space, and more particularly to an acoustic security system and related method for detecting such disturbances.

State of the Art

There are many instances in which a space must be monitored to detect unexpected disturbances or intrusions. Commercial, governmental, military, and residential security systems are widely used to detect and signal unwarranted intrusion into a protected premises. Museums and art galleries rely on such security systems to protect artwork and valuables. Caregivers sometimes rely upon motion detection systems to warn that patients who are being cared for have moved from a bed or chair, or from one room to another. Motion detection systems have also been used to turn lights and/or air conditioning systems on when a person enters a room, or to turn lights and air conditioning systems off if no motion has been detected within such space for a predetermined period of time. In some instances, the detection of movement may be used to turn on an audio/video system to transmit and/or record sounds and images in the monitored premises.

Security systems rely upon a variety of actuators including simple mechanical switches, conductive tape, reed switches cooperating with magnets, and vibration sensors to detect an intrusion through a door or window. These sensors, however, are not typically capable of detecting movement within the protected premises after a person has gained access thereto. Optical systems using light beams (visible or infrared) and photosensors have been used to detect an object crossing the light beam for triggering an alarm. Likewise, ultrasonic-based motion detectors have been used in the past to emit high-frequency sound signals that reflect off nearby objects; the reflected signal is received, and Doppler-shift changes in the received signals can be used to signal the detection of a person or object. Motion detection has also been accomplished in the past by processing video signals from a video camera with computer software which detects changes in the video image being received.

It has been known in the past to sense audible signals within the range of human hearing to detect intrusions within a monitored space. For example, in U.S. Pat. No. 4,097,853 to Francis, sound waves of a particular frequency are broadcast within a space to be monitored. A speaker used to broadcast the source sound waves also acts as a transducer for receiving reflected sound waves. Reflected sound waves bouncing off of an intruder create a phase shift of the reflected sound wave relative to the originally broadcasted sound wave, in accordance with the Doppler effect. This phase shift is detected to signal the presence of an intruder. U.S. Pat. No. 3,754,222 to Eisenberg operates in a similar manner. Such systems tend to be subject to generation of false alarms, notwithstanding the addition of frequency-selective filters. In addition, systems that rely upon Doppler shift will not detect the presence of a foreign object, or person, unless that object or person is moving.

In U.S. Pat. No. 5,828,626 to Castile, et al., a transmitter produces a continuous sinusoidal acoustic signal of constant amplitude and frequency within a space to be protected, and reflected signals create a standing wave field within the protected space. Changes to the standing wave field are detected to signal an intrusion alarm.

In U.S. Pat. No. 7,535,351 to Reymond, a pair of transmitting speakers broadcast signals of the same audible frequency, but configured to be 180 degrees out of phase with each other. A pair of microphones are positioned in the null zones between the transmitting speakers create first and second audio signals that are amplified and converted from analog form to digital form. The digital signals are sampled, accumulated and averaged. An initial reference vector is stored in memory; thereafter, as averaged samples are generated, a difference vector is generated by comparison to the stored reference vector. The magnitude of the difference vector is compared to the magnitude of the reference vector, and when it exceeds a predetermined threshold, an alarm is sounded.

Patent application publication No. US2012/0087211 A1 to Lee, et al. discloses a low-power security and intrusion detection system wherein a sound source is provided to generate an audible signal within a space to be monitored. A number of microphones are provided, and through means not expressly disclosed, an acoustic wave transfer function is produced. An initial acoustic wave transfer function is stored for comparison to the acoustic wave transfer function generated during active monitoring. When the comparison differs by a sufficient amount, intrusion is detected. U.S. Pat. No. 8,797,407 to Lee, et al., discloses a similar system.

All of the systems described above suffer from various disadvantages. Some require the injection of tones into the monitored premises which may create a distraction. Others consume significant power, precluding reliance upon self-contained battery power sources. Some of these prior systems appear to require significant electronic hardware to implement, while others do not identify any specific hardware that can be used to implement such systems. Some of such systems require the use of two or more microphone transducers and/or two or more speakers. Virtually all of such systems include a sound wave generator for projecting sound waves into the monitored premises.

Accordingly, it is an object of the present invention to provide an inexpensive, low-power acoustic system that can reliably detect a change of conditions within a monitored space for creating a warning of intrusion and/or movement within the monitored space, while minimizing generation of false alarms.

Another object of the present invention is to provide such an acoustic system that can reliably function, in most instances, even without injecting sounds into the monitored space beyond those already present.

Still another object of the present invention is to provide such an acoustic system that can operate on battery power for extended periods.

A further object of the present invention is to provide such an acoustic system that can easily be manufactured from a minimal number of readily-available electronic components.

Yet another object of the present invention is to provide such an acoustic system that can reliably function using a single microphone or similar transducer, if desired.

A still further object of the present invention is to provide a method of operating an acoustic security system that achieves the foregoing objectives.

These and other objects of the present invention will become more apparent to those skilled in the art as the description of the present invention proceeds.

SUMMARY OF THE INVENTION

Briefly described, and in accordance with preferred embodiments thereof, a first aspect of the present invention relates to an acoustic system for detecting a disturbance within a monitored space, wherein at least one transducer (for example, a microphone) is located within the space being monitored for producing analog electrical signals in response to audio signals therein. An analog-to-digital (A-to-D) converter receives the analog signals from the transducer and provides corresponding digital signals. The output of the A-to-D converter is coupled to the input of a digital signal processor for periodically sampling the received digital signal at a predetermined sampling rate.

The digital signal processor, or "DSP", includes associated storage for storing a number, n, of digital signal samples $S_0, S_{-1}, S_{-2}, S_{-3}, \ldots, S_{-(n-1)}$ corresponding to those digital signals received by the DSP during the most recent n periodic sampling intervals. To enhance the accuracy of the preferred embodiment, the number n of stored digital samples is preferably greater than 50. Within the meaning of this disclosure, the term $S_0$ represents the digital signal sampled by the DSP during a current sampling interval; the term $S_{-1}$ represents the digital signal sampled by the DSP during an immediately preceding sampling interval; the term $S_{-2}$ represents the digital signal sampled by the DSP two sampling intervals before the current sampling interval; the term $S_{-3}$ represents the digital signal sampled by the DSP three sampling intervals before the current sampling interval; and the term $S_{-(n-1)}$ refers to the digital signal sampled by the DSP n−1 sampling intervals before the current sampling interval.

Within the DSP, a series of multipliers are configured; preferably, the number of such multipliers corresponds to the number of digital signal samples currently stored by the DSP. Each such multiplier serves to multiply the current digital signal sample $S_0$ by one of the previous digital signal samples $S_{-1}, S_{-2}, S_{-3}, \ldots, S_{-(n-1)}$ to produce a corresponding multiplication product $P_{-1}, P_{-2}, P_{-3}, \ldots, P_{-(n-1)}$. Also within the DSP, each of these multiplication products is accumulated by a corresponding series of accumulators. Each such accumulator is coupled to a corresponding one of the multipliers for accumulating the multiplication products produced thereby over a series of sampling intervals to generate corresponding accumulated sums $A_{-1}, A_{-2}, A_{-3}, \ldots, A_{-(n-1)}$. Preferably, as each new multiplication product is added, within an adder, to the previous accumulated sum, the previous accumulated sum is slightly attenuated to prevent the accumulated sum from increasing infinitely. This attenuation process is described in greater detail below.

In order to produce reference standards for comparison purposes, the acoustic system is initially operated in a reference mode under known, undisturbed conditions. The DSP saves, in its associated storage, the accumulated sums $A_{-1}, A_{-2}, A_{-3}, \ldots, A_{-(n-1)}$ generated by the plurality of accumulators, the DSP stores in memory the accumulated sums generated during known periods when the monitored space is not disturbed. In essence, these accumulated sums provide a digital representation of the acoustic field that is ordinarily present in the monitored space.

The present invention is capable of operating in a passive mode, relying solely upon background noise within the monitored space, and without the injection of particular tones or other noise. On the other hand, the background noise present within the monitored space will vary, depending upon whether the heating or cooling system is running; whether appliances like refrigerators, fans, computers are running; and whether traffic from outdoors is light or heavy. Preferably, several sets of accumulated sums are stored, representing the acoustic field of the monitored space at different times of day; for example, one set of saved accumulate sums might characterize the monitored space when an air conditioner is running, and another set of saved accumulated sums might characterize the monitored space when the air conditioner is not running. The saved digital pattern of accumulated sums under these various conditions are impacted by the location and placement of furniture and other objects within the monitored space, since these objects cause reflections of sound waves present in the monitored space.

When the present invention is being operated in monitoring mode, the DSP creates accumulated sums in the same manner as previously described. The DSP then compares currently generated accumulated sums to the previously stored accumulated sums that were generated during known periods when the monitored space was not disturbed. If there is a relatively close correspondence between the currently generated accumulated sums and at least one of the previously-saved reference standard accumulated sums, then all is well, and no alarm need be generated. If, on the other hand, the current values for the accumulated sums do not substantially correspond to one of the previously-saved reference standard accumulated sums, then it is very likely that the monitored space has been disturbed (e.g., an intrusion has taken place), and an alarm signal is generated. Preferably, the acoustic system includes a wireless transmitter for transmitting an alarm signal to a receiver; this receiver might be located at the monitored site, but perhaps in a different room. Alternatively, this receiver might be located remote from the monitored site.

The accuracy of the present invention is enhanced to a degree as the sampling rate of the digital signals produced by the A-to-D converter is increased. However, faster sampling rates may require that a greater number of samples be stored; that the DSP operate under higher-performance conditions; and that the DSP consume more power. Accordingly, it is preferred that the DSP sampling rate lie between approximately 100 digital signals per second and 5,000 digital signals per second. Similarly, the accuracy of the present invention may be improved to a certain extent by increasing the number of digital signal samples that are stored for multiplication and accumulation. It is preferred that the DSP stores at least 100 digital signal samples $S_0, S_{-1}, S_{-3}, \ldots, S_{-(99)}$.

Thus far, the present invention has been described in regard to an embodiment which uses a single microphone, or other transducer, to create an analog electrical audio signal. It will be appreciated that, for enhanced accuracy, two or more transducers, coupled to two or more A-to-D converters, may simultaneously provide digital signals for sampling by two or more inputs of the DSP. The DSP may then be configured to provide duplicate storage locations, multipliers, and accumulators for each of the two or more incoming digital signals to characterize the acoustic field within the monitored space to an even greater degree.

It should also be appreciated that, while the present invention will typically perform satisfactorily without the need to actively inject an audio tone or other noise into the monitored space, random white noise may be actively transmitted into the monitored space to enhance the function of the present invention. No particular frequency or tone is required; indeed, random white background noise works well, and is less likely to attract the attention of, or distract, anyone within the monitored space.

Another aspect of the present invention relates to a method of detecting a disturbance within a monitored space. In performing such method, a transducer is provided within the monitored space for converting audio signals into analog electrical signals. These analog electrical signals are converted into corresponding digital signals, as, for example, by using an A-to-D converter. The converted digital signal is sampled at periodic sampling intervals. Successive sampled digital signal samples are stored corresponding to the most-recent sampling intervals. The current digital sample $S_0$ is multiplied by previous digital signal samples (e.g., $S_{-1}$, $S_{-2}$, . . . ), and the products of such multiplications are accumulated over a plurality of periodic sampling intervals to produce accumulated sums.

In practicing the aforementioned method, values of the accumulated sums obtained when the monitored space is not disturbed are stored for purposes of later comparison. During active monitoring, current values for the accumulated sums are compared to the previously stored values for the accumulated sums, and an alarm signal is created when the current values for the accumulated sums do not correspond to the previously stored values for the accumulated sums. Creation of the alarm signal may include the step of wirelessly-transmitting an alarm signal to an associated receiver.

Preferably, this method is performed using a sampling rate of between 100 digital signals per second and 5,000 digital signals per second. It is also preferred that at least the most recent 100 digital signal samples are stored for multiplication and accumulation. As noted above, the step of accumulating each of the multiplication products preferably includes attenuating the accumulated sum before adding it to the current multiplication product to prevent the accumulated sum from increasing infinitely.

The method described thus far requires only a single transducer. However, it is possible to increase accuracy by providing additional transducers within the monitored space, converting analog electrical signals provided by such additional transducers into corresponding additional digital signals, and then repeating the sampling, multiplication, and accumulation steps already described.

While the above-described method will ordinarily perform without the need to broadcast an audio tone or other noise into the monitored space, the method may include, if desired, the broadcast of audio signals into the monitored space. In this instance, it is preferred that the added audio signals be in the form of random white background noise.

The foregoing and other features and advantages of the present invention will become more apparent from the following more detailed description of the particular embodiments of the invention, as illustrated in the accompanying drawings.

DETAILED DESCRIPTION OF THE PREFERRED EMBODIMENTS

Figure 1:
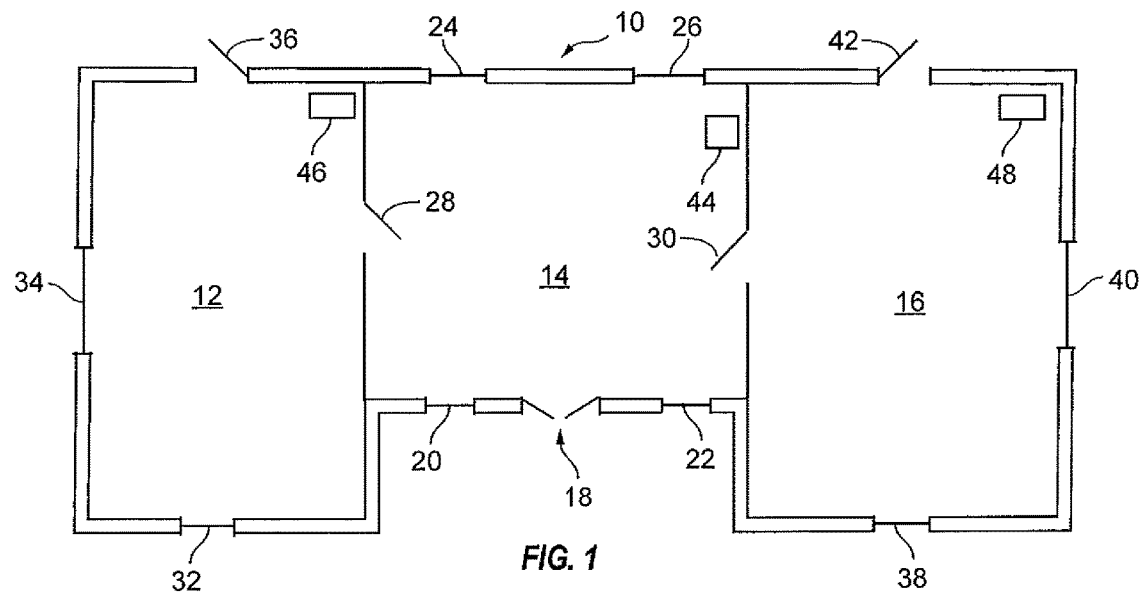
FIG. 1 is a top view of a premises to be protected and incorporating three separate rooms.

Referring to FIG. 1 of the patent drawings, building 10 includes three enclosed rooms, including leftmost room 12, central room 14, and rightmost room 16. Front entry door 18 opens into central room 14. Windows 20 and 22 lie on either side of front entry door 18. Room 14 also includes two rear windows 24 and 26. Interior doors 28 and 30 provide access from central room 14 to side rooms 12 and 16, respectively. Side room 12 includes windows 32 and 34 and rear exterior door 36. Likewise, side room 16 includes windows 38 and 40 and rear exterior door 42. All of the exterior doors and windows permit some outdoor noises to enter their respective rooms.

Still referring to FIG. 1, central room 14 includes an acoustic security system 44 which embodies the present invention. Likewise, side room 12 includes an acoustic security system 46, and side room 16 includes an acoustic security device 48, which also embody the present invention. As will be described in greater detail below, each of acoustic security systems 44, 46 and 48 preferably include a wireless communication function, which may allow acoustic security systems 44, 46 and 48 to communicate with each other, if desired.

Figure 2:
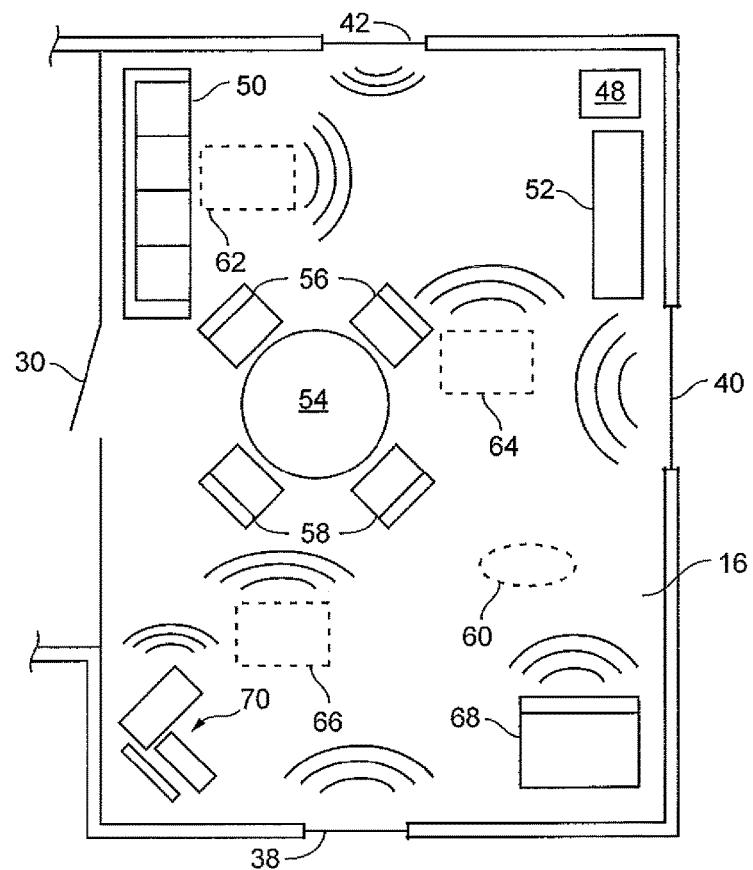
FIG. 2 is an enlarged top view of one of the rooms shown in FIG. 1 and indicating sources of noise and objects within the room.

In FIG. 2, side room 16 is shown in greater detail. Side room 16 may include furniture, including couch 50, bookcase 52, and conference table 54 surrounded by chairs 56 and 58. All of such furniture items influence transmission and reflection of sound waves within side room 16. Similarly, if a person, represented by dashed oval 60, is inside side room 16, that person will also influence the transmission and reflection of sound waves within the room. All of these objects, together with the walls, doors, windows, floor, and ceiling of room 16 combine together to determine how sound waves travel, and reflect, within room 16, and determine a characteristic acoustic field, or "signature", of room 16. If the position of such items is changed, or if person 60 enters into, or moves within, room 16, then the prior acoustic field, or signature, is also changed.

Side room 16 also includes certain features which can act as sources of sound within the room. For example, room 16 may have HVAC vents 62, 64 and 66 which are mounted in the ceiling of room 16. When the air circulation fan is blowing, or when the air conditioning unit is running, or when the heater is running, sound is typically sourced into room 16 through such vents. Another example is refrigerator 68 which includes a motorized compressor and circulation fans that generate noise within room 16 when they are running. Yet another example is computer station 70 within room 16, which includes cooling fans that create sound waves. Once again, exterior windows 38 and 40, and exterior door 42, also serve to admit sounds from outside building 10. Indeed, the sound level present in a typical room ranges between 40 decibels to 50 decibels. As will now be explained, these pre-existing sound sources can be used to advantage in practicing the present invention.

Figure 3A:
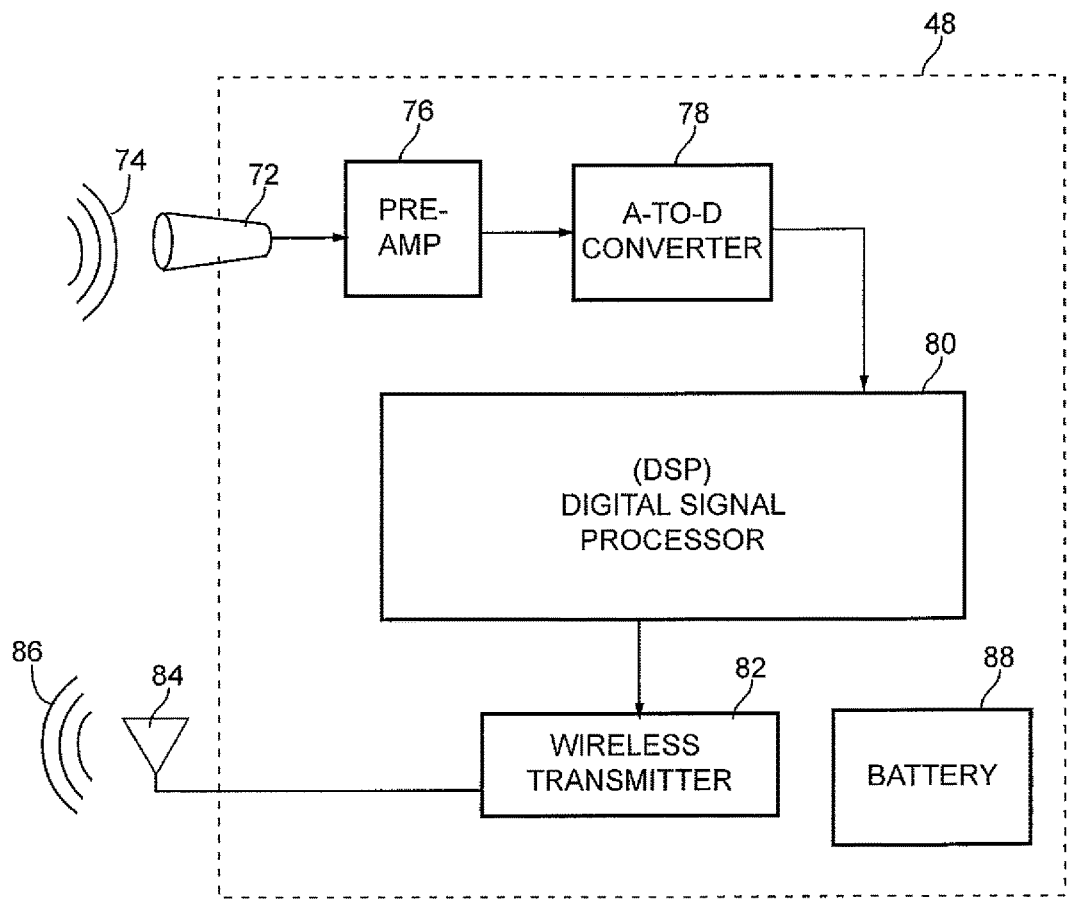
FIG. 3A is a block diagram of an acoustic security system implemented in accordance with a preferred embodiment of the present invention and using a single microphone transducer.

Turning now to FIG. 3A, acoustic security system 48 of FIGS. 1 and 2 is shown in block diagram format. Acoustic security system 48 includes a sound transducer, or microphone 72, responsive to sound waves 74 within room 16. Microphone 72 serves to convert the audio signals within sound waves 74 into analog electrical signals. Microphone 72 is coupled to a pre-amplifier 76, which amplifies the weak analog electrical signal produced by microphone 72 and passes it to an analog-to-digital converter 78. The digital output produced by A-to-D converter 78 is generally a series of binary bits (often from 8 to 16 bits) expressed in two's complement format which express both the sign (positive or negative) and magnitude of the original analog signal.

Still referring to FIG. 3A, the multiple-bit output produced by A-to-D converter 78 is provided to an input terminal of a digital signal processor, or DSP 80. In the preferred embodiment, DSP 80 is a Model 7100 Ezairo®-brand open-programmable single-chip DSP commercially available from ON Semiconductor of Phoenix, Ariz. This DSP provides high performance while consuming relatively little power, and has been used in the past to implement hearing aids and hearing implant devices. This DSP is adapted to receive signals generated by as many as four microphones, and can even perform the pre-amplification and A-to-D functions onboard the DSP chip. The arithmetic section of this IC chip is designed to work with up to 24-bit digital signals, while also including a separate microcontroller. It also includes a programmable filter engine for creating digital filters. It is also adapted to directly drive wireless transceivers. Onboard memory stores both programming instructions and computational data.

The manner by which DSP 80 processes incoming digital signals will be described in greater detail below in conjunction with FIGS. 4-6. If DSP 80 determines that an alarm should be transmitted, then DSP 80 activates wireless transmitter 82 to transmit an alarm signal via antenna 84 and radio waves 86. As shown in FIG. 3A, a battery 88 is also included in acoustic security system 48 to provide electrical power to the other components therein.

Figure 3B:
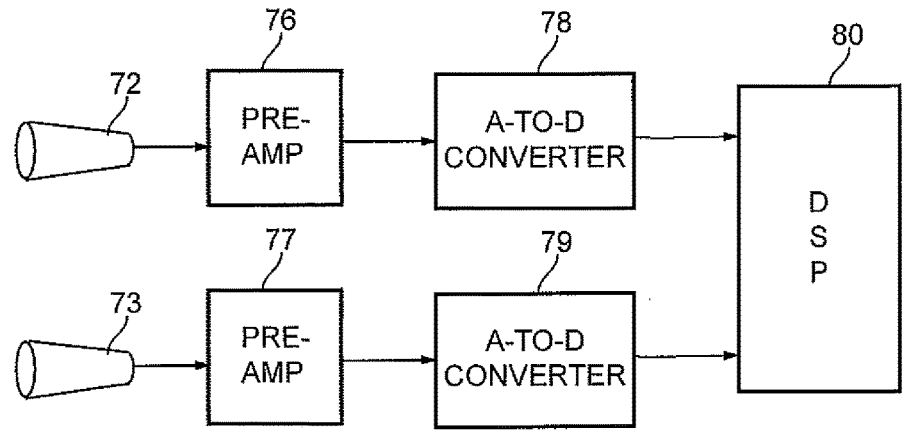
FIG. 3B is a block diagram similar to FIG. 3A but illustrating how a second microphone transducer may be added.

FIG. 3B summarily illustrates a variation of the embodiment of the invention shown in FIG. 3A, whereby two microphones 72 and 73 are provided rather than a single microphone. In FIG. 3B, the signals produced by microphones 72 and 73 are pre-amplified, converted to digital form, and simultaneously provided to DSP 80. The manner in which the digital signal provided by A-to-D converter 79 is processed within DSP 80 is virtually the same as for the digital signal provided by A-to-D converter 78. Accordingly, the processing of the digital signal provided by A-to-D converter 79 will not be separately described. Those skilled in the art will appreciate, however, that the use of two or more microphones may allow the DSP to not only determine that the monitored space has been disturbed, but to also determine the location/direction of the disturbance, as for example, by triangulating the location of the object within the room. The use of two or more microphones may permit the acoustic security system to, for example, distinguish between the opening of a door and the breaking of window. Similarly, the use of two or more microphones may permit the acoustic security system to determine that the disturbance is relatively close to the ground, as in the case of a pet. Multiple microphones could be used to restrict the generation of alarms to only those situations wherein the object that has changed the digital signature of the room extends above a certain height. Multiple microphones could also be used to actually track the movement of the intruder within room 16.

Figure 4:
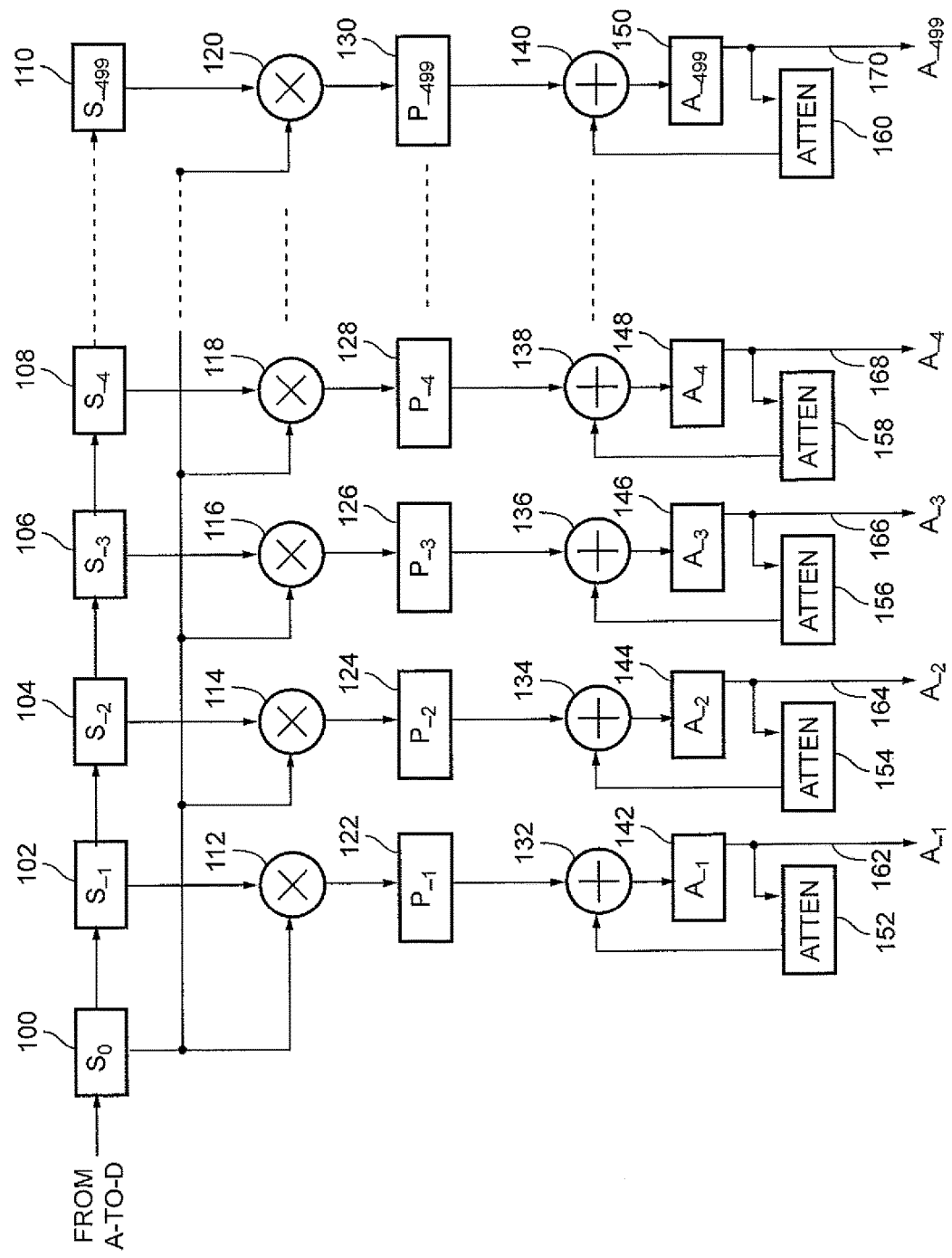
FIG. 4 is a block diagram showing the manner in which a digital signal processor operates mathematically upon a series of time-staggered digital signal samples to characterize the acoustic field within the monitored space.

FIG. 4 of the drawings illustrates a preferred manner for processing sampled digital signals. In this described embodiment, the sampling rate, i.e., the rate at which the incoming digital signal is sampled, is set at 1,000 times per second, or 1 kilohertz. Storage within the DSP is allocated to save the 500 most recently sampled digital signals. As shown in FIG. 4, the most current digital signal sampled, $S_0$, received during a current sampling interval, is saved in storage location 100. The immediately-preceding sampled digital signal, $S_{-1}$, received during an immediately preceding sampling interval, is saved in storage location 102. $S_{-2}$ is the digital signal sample received two sampling intervals before the current sampling interval, and is saved in storage location 104. $S_{-3}$ is the digital signal sample received three sampling intervals before the current sampling interval, and is saved in storage location 106; $S_{-4}$ is the digital signal sample received four sampling intervals before the current sampling interval, and is saved in storage location 108. This pattern is continued for as many samples, n, as are saved, i.e., $S_{-(n-1)}$, wherein $S_{-(n-1)}$ is the digital signal sample received n−1 sampling intervals before the current sampling interval. In the embodiment shown in FIG. 4, n equals 500, and storage location 110 stores digital sample $S_{-499}$. Storage locations 100-110 effectively function as a 500-byte shift register, and each time a new digital signal is sampled, the previously stored samples are shifted one position to the right relative to FIG. 4.

Since, in the example of FIG. 4, digital signals are sampled 1,000 times per second, and since the most-recent 500 digital signal samples are saved, DSP 80 (see FIG. 3A) is working with digital signal values that were sampled during the past one-half second. When selecting sampling rate, and the number n of digital signal values $S_0$, $S_{-1}$, $S_{-2}$, $S_{-3}$, . . . to be stored, several factors must be considered.

For example, the range of distances within the space to be monitored is a factor. The speed of sound varies depending on the environment through which such sound waves are being transmitted. Assuming that the air within the monitored space is at sea level, that the air is relatively dry, and that the air temperature is at normal room temperature, then sound waves will travel within the monitored space at approximately 1,123 feet per second. Thus, in our example, sound waves within the monitored space could travel 1,123 ft/sec×0.5 seconds, or roughly 560 feet within the one-half second window of time represented by the stored digital signals saved in storage locations 100-110. Since 560 feet is relatively large in comparison to the smaller dimensions of the typical residential room or office suite, it is more than adequate for such purposes.

Another factor to be considered is anti-aliasing measures and the minimum Nyquist sampling rate. White noise within the monitored space, within the frequency range of 100 Hz to 500 Hz, is sufficient to allow the present invention to perform well. The Nyquist formula of sampled signal reconstruction dictates that the minimum sampling frequency should be twice the highest frequency of the signal to be sampled. Thus, if signals of a frequency as high as 500 Hz are to be sampled, then the sampling rate should be at least twice that frequency, or 1,000 Hz. If there are audio signals present within the monitored space of significant magnitude and having frequencies above 500 Hz., then a low-pass filter may be added to attenuate such frequencies to minimize any so-called "aliasing" problems. This low-pass filter could be implemented either within pre-amplifier 76, or by creating such a low-pass filter in a digital manner within DSP 80.

Alternatively, the sampling rate could be increased, say from 1 kilohertz to 2 kilohertz; such an increase in the sampling rate would help prevent aliasing issues arising from signals within the 500 Hz to 1,000 Hz range, but at the expense of decreasing the depth, or physical distance, of the monitored space being covered, for the reasons explained above. It is preferred that the sampling rate lie within the range of 100 samples per second and 5,000 samples per second.

It would be expected that the monitored space would include significant components of 60-cycle noise from lighting and other appliances powered by the 60-cycle electrical wall outlets within the monitored space. Audio signals at such low frequencies do not contribute significantly to the function of the present invention, and if sufficiently large in magnitude, such low-frequency signals could actually detract from the operation of the present invention. If desired, such 60-cycle "buzz" could be filtered out of the incoming audio signal, either by incorporating a high-pass filter within pre-amplifier 76, or by creating such a high-pass filter in a digital manner within DSP 80; this high-pass filter would attenuate signals having a frequency below 70-100 Hz.

The accuracy of the present invention may be improved by increasing the number n of digital samples that are stored. On the other hand, as the number n is increased, the demands placed upon DSP 80, and the power that it consumes, are also increased. It is preferred that the number n be no less than 50, and is preferably at least 100.

Still referring to FIG. 4, DSP 80 is configured to provide a series of multipliers 112, 114, 116, 118 and 120. The number of such multipliers is n−1, wherein n is once again the number of digital signal samples stored in storage locations 100-110. Preferably, each such multiplier receives, as one of its operators, the current digital signal sample $S_0$. Multiplier 112 receives, as its second operator, or multiplicand, the digital signal value $S_{-1}$ saved in storage location 102. The result, or product $P_{-1}$, of multiplier 112 is coupled to product storage location 122. Multipliers 114, 116, 118 and 120 operate in a similar manner for creating resulting products $P_{-1}$, $P_{-2}$, $P_{-3}$, $P_{-4}$, ..., $P_{-499}$, which are stored in product storage locations 124, 126, 128, 130, respectively. It might be noted that, based upon the signature of the monitored space, these time-staggered resulting products $P_{-1}$, $P_{-2}$, $P_{-3}$, $P_{-4}$, ..., $P_{-499}$ will increase and decrease, depending upon the time needed for a reflected sound wave to reach microphone 72 after a direct sound wave from the same sound source has already reached microphone 72. Thus, if a reflected sound wave were to travel an extra ten feet within the monitored space before reaching microphone 72, one would expect to see a reinforcement of the original direct sound wave occurring approximately 0.009 seconds [i.e., 10 feet/560 feet×0.50 seconds] after the direct sound wave signal had been sampled, roughly corresponding to resulting product $P_{-9}$.

Still referring to FIG. 4, the resulting products $P_{-1}$, $P_{-2}$, $P_{-3}$, $P_{-4}$, ..., $P_{-499}$ are each averaged via accumulation. In the preferred embodiment, this accumulation process is achieved through the use of accumulators, adders and attenuators. A series of n−1 accumulators 142, 144, 146, 148, 150 are configured within DSP 80. Each of the accumulators is initially reset to zero. Accumulator 142 is used to accumulate the accumulated sum $A_{-1}$; likewise, accumulators 144, 146, 148 and 150 are used to accumulate the accumulated sums $A_{-2}$, $A_{-3}$, $A_{-4}$, and $A_{-499}$, respectively. DSP 80 is also configured to provide an adder 132 at the input to accumulator 142. Adder 132 adds resulting product $P_{-1}$ to a slightly attenuated version of the prior value of accumulated sum $A_{-1}$ supplied by attenuator 152. Attenuator 152 is essentially a multiplier that multiplies the prior value of accumulated sum $A_{-1}$ by a fraction, e.g., the fraction 499/500. The reason for attenuating the prior accumulated sum is to prevent the accumulated sum from eventually becoming an infinitely high number in those instances when there happens to be a high positive correlation between the currently sampled digital signal and a prior time-staggered sampled signal.

In an identical fashion, adders 134, 136, 138 and 140 add resulting products $P_{-2}$, $P_{-3}$, $P_{-4}$, and $P_{-499}$ to attenuated versions of accumulators 144, 146, 148 and 150 to provide updated accumulated sums $A_{-2}$, $A_{-3}$, $A_{-4}$, and $A_{-499}$. Attenuators 154, 156, 158 and 160 function in the same manner as has been described for attenuator 152.

Figure 5:
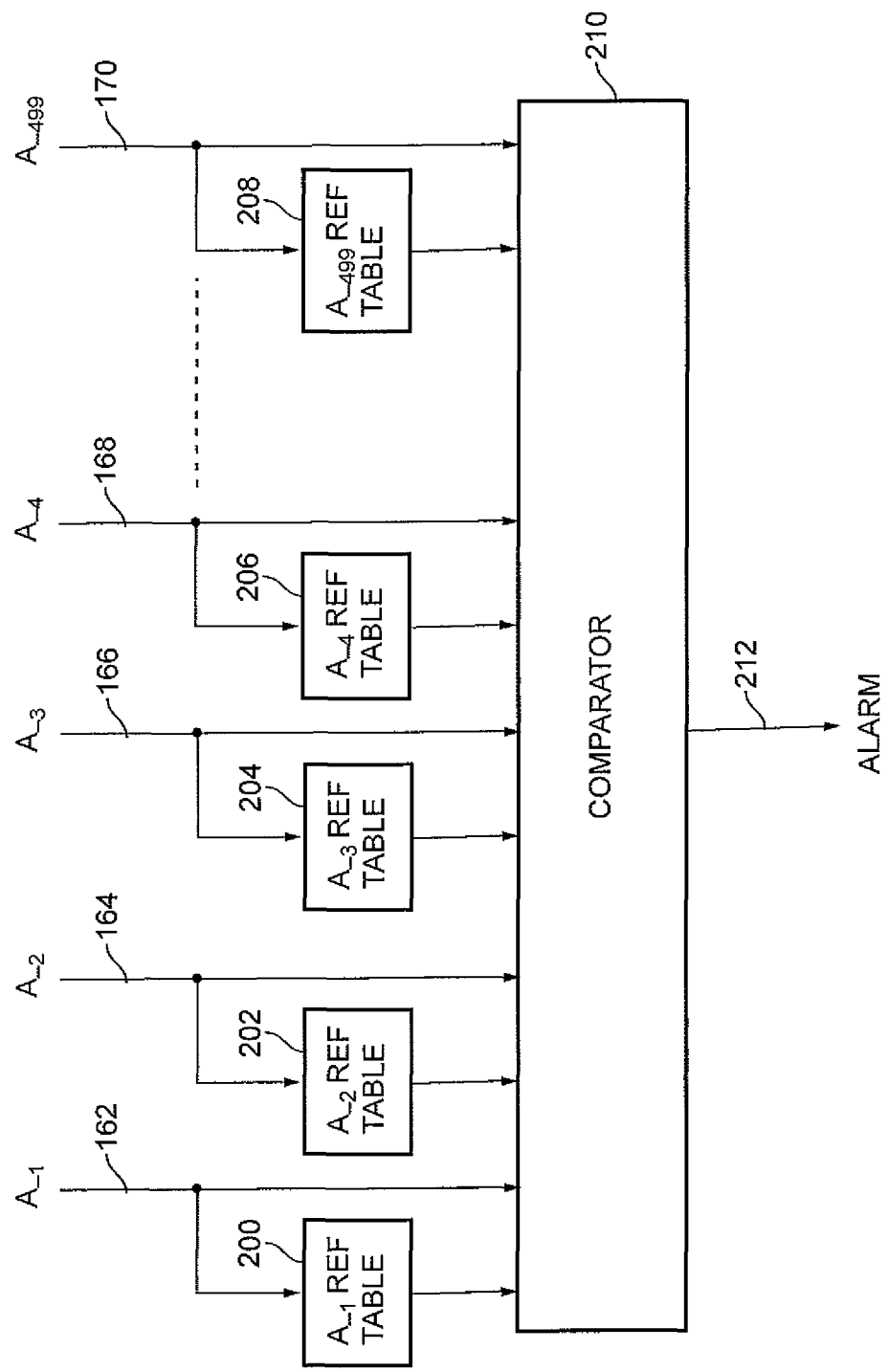
FIG. 5 is a further block diagram wherein the accumulated sums shown in FIG. 4 are further processed to detect whether the monitored space has been disturbed.

Turning now to FIG. 5, the accumulated sums $A_{-1}$, $A_{-2}$, $A_{-3}$, $A_{-4}$, and $A_{-499}$ shown in FIG. 4 are conveyed along data paths 162, 164, 166, 168, and 170. As mentioned above, before any active monitoring for alarm conditions begins, the acoustic security system must first capture one or more representations of the acoustic field within the space to be monitored when in a known, undisturbed condition. As already described, the pattern of accumulated sums generated by DSP 80 is partly a result of the physical configuration of room 16 (see FIG. 2) and also partly a result of differing sound sources which are already within room 16 and/or which enter room 16. For example, the accumulated sums will differ from one time to the next if furniture and/or objects within the room is re-positioned. The accumulated sums can also be expected to change as sound sources (HVAC systems, refrigerators, computers, other appliances, outdoor traffic, etc.) transition on and off. Accordingly, the series of accumulated sums produced at different, undisturbed moments of time, are saved during a "reference mode" of operation within a storage reference table within DSP 80 to characterize the "normal" acoustic field within room 16. If desired, the statistical probability of each such pattern of accumulated sums can be computed, and the top 10-20 accumulated sum patterns can be stored in the reference table represented by storage locations 200, 202, 204, 206, 208 in FIG. 5. This process of storing reference patterns in the reference table can be repeated on a daily basis, or more frequently, if desired.

After storing the "normal" accumulated sums in the reference table, the acoustic security system is ready to switch over to active monitoring mode. Still referring to FIG. 5, current accumulated sum values $A_{-1}$, $A_{-2}$, $A_{-3}$, $A_{-4}$, and $A_{-499}$ are provided to a comparator 210 programmed within DSP 80. The reference table values for the "normal" accumulated sums, as stored in storage locations 200-208, are also provided to comparator 210. Comparator 210 then compares the current accumulated sum values $A_{-1}$, $A_{-2}$, $A_{-3}$, $A_{-4}$, and $A_{-499}$ to the previously-stored "normal" accumulated sums saved in the reference table. If a match is found, then room 16 has not been disturbed, and there is no need to create an alarm. However, if no match is found, and if the current accumulated sums differ in a significant respect from all of the "normal" accumulated sums in the reference table, then the condition of room 16 has been disturbed. This could occur, for example, if a door were opened, if a window were opened or broken, or if a person 60 (see FIG. 2) entered into, or moved within, room 16 after the monitoring mode began. In this event, comparator 210 of DSP 80 creates alarm signal 212, which may be used to trigger wireless transmitter 82 (see FIG. 3A).

It is anticipated that the "normal" accumulated sums will lie within one or more typical ranges of values. The process of comparing current accumulated sum values to "normal" accumulated sums in the reference table could alternatively involve analyzing whether the current accumulated sum values lie within such typical ranges of values, and if they do not, then an alarm is triggered.

In the case shown in FIG. 3B, wherein two microphones are used, DSP 80 can be configured to determine the direction of arrival, and distance, of the source sound relative to acoustic security system 48. This ability to "locate" the source of the sounds being received can be employed, if desired, to help DSP 80 discriminate between sounds that are considered to be "normal" versus sounds generated by, or reflected from, objects that are not ordinarily present.

While the present invention typically works well without the need to inject additional sound into the monitored space, there may be instances when a particular room is so quiet that it would be advantageous to add noise to enhance the ability of the present invention to characterize the acoustic field therein. In this case, a white noise generator driven by a random number generator, and including a speaker, can be added to acoustic security system 48, either together therewith, or as a separate component within the same room. The added white noise might include frequencies between 100 Hz and 500 Hz, and might range in magnitude between 20 decibels and 40 decibels, without being noticeable or distracting.

Figure 6:
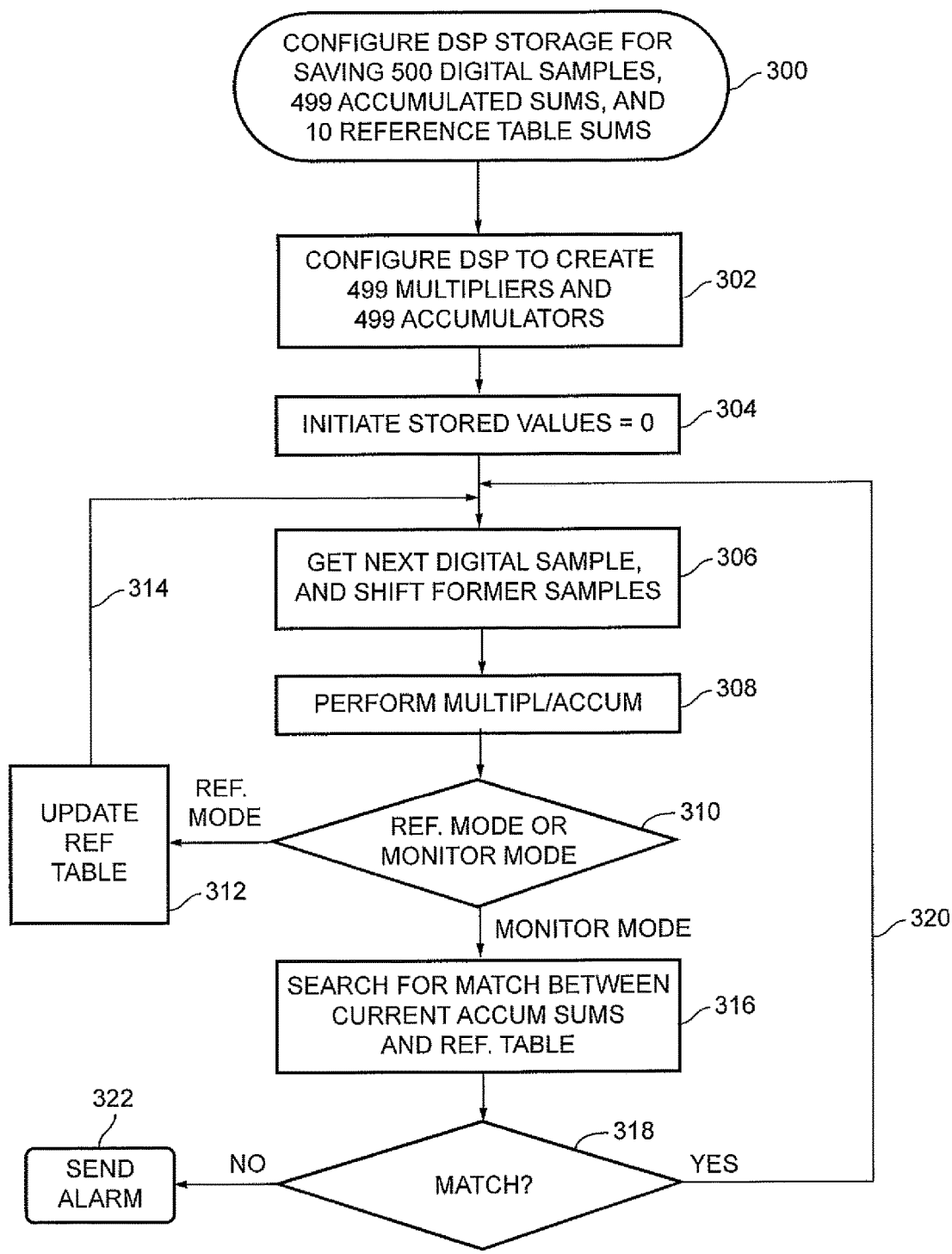
FIG. 6 is a flowchart graphically illustrating the manner in which the digital signal processor is configured and programmed to implement the present invention.

FIG. 6 of the patent drawings is a flowchart that graphically illustrates the steps that DSP 80 is programmed to perform. Control of the process begins at step 300, wherein the storage within DSP 80 is configured to allocate 500 storage locations to save the 500 digital signal sample $S_0$, $S_{-1}$, $S_{-2}$, $S_{-3}$, ..., $S_{-499}$. Storage is also allocated to save the 499 accumulated sums $A_{-1}$, $A_{-2}$, $A_{-3}$, $A_{-4}$, ... $A_{-499}$. If desired, storage may also be allocated to temporarily save the multiplication products $P_{-1}$, $P_{-2}$, $P_{-3}$, $P_{-4}$, ..., $P_{-499}$ that are generated during each sampling interval. In addition, DSP 80 is programmed to allocate sufficient storage to save the "normal" accumulated sums that make up the above-described reference table, and which provide the expected accumulated sum values obtained under undisturbed conditions.

Next, step 302 in FIG. 6 represents instructing DSP 80 to create the series of multipliers 112-120 and accumulators 142-150 (including associated adders 132-140 and attenuators 152-160) in order to generate accumulated sums $A_{-1}$, $A_{-2}$, $A_{-3}$, $A_{-4}$, ... $A_{-499}$.

At step 304, DSP 80 zeroes out all storage locations before any operations begin. Control then passes to step 306, in which DSP 80 obtains the next digital signal sample $S_0$, while shifting all of the previous samples saved in storage locations 100-110 one position to the right (see FIG. 4). At step 308, DSP 80 performs the multiply and accumulate operations shown in FIG. 4 for the current sample interval, thereby generating updated accumulated sums $A_{-1}$, $A_{-2}$, $A_{-3}$, $A_{-4}$, ... $A_{-499}$.

At step 310 of FIG. 6, a determination is made as to whether acoustic security system 48 is operating in reference mode (to acquire and/or update reference values in the reference table) or in monitoring mode (to detect a disturbance of the monitored space). If operating in reference mode, control passes to step 312, wherein updated accumulated sums $A_{-1}$, $A_{-2}$, $A_{-3}$, $A_{-4}$, ... $A_{-499}$ may be stored within the reference table to exemplify "normal" accumulated sum values; control is then returned along path 314 to step 306, and a new sampling interval begins.

On the other hand, if the acoustic security system is operating in monitoring mode, then control passes from step 310 to step 316. This step 316 corresponds to the comparator 210 in FIG. 5. At step 316, DSP 80 determines whether the current accumulated sum values $A_{-1}$, $A_{-2}$, $A_{-3}$, $A_{-4}$, ... $A_{-499}$ match with one of the accumulated sum entries stored in the reference table. As explained above, this matching process may involve a comparison of particular accumulated sum values to see if they lie within a statistically significant range of normal values. After searching for a match, control passes to step 318. If a match is found, then control passes along path 320 back to step 306, and a new sampling interval begins. However, if a match is not found, then control passes to step 322 for sending an alarm signal.

Those skilled in the art will appreciate that an acoustic security system, and related method, have been described which is relatively inexpensive and easy to manufacture, uses relatively little power, and is capable of operating on battery power for extended periods. The disclosed system is capable of reliably detecting a change of conditions within a monitored space for creating a warning of intrusion and/or movement within the monitored space, while minimizing generation of false alarms. Moreover, the disclosed acoustic system can reliably function, in most instances, using background sounds already present within the monitored space without the need to inject additional sounds into the monitored space. In addition, the disclosed system can operate in a reliable manner using only a single microphone or other sound transducer.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A system for detecting a disturbance within a monitored space, comprising in combination:
   a) a transducer disposed within the monitored space for creating an analog electrical signal in response to audio signals within the monitored space;
   b) an analog-to-digital converter coupled to the transducer and generating a digital signal corresponding to the analog electrical signal currently created by the transducer;
   c) a digital signal processor having an input coupled to the analog-to-digital converter for receiving the digital signal generated by the analog-to-digital converter, the digital signal processor providing:
      i) storage for storing n digital signal samples $S_0$, $S_{-1}$, $S_{-2}$, $S_{-3}$, ..., $S_{-(n-1)}$ corresponding to digital signals received by the digital signal processor during a most recent n periodic sampling intervals, wherein n is an integer greater than 50, wherein $S_0$ is the digital signal sample received during a current sampling interval, wherein $S_{-1}$ is the digital signal sample received during an immediately preceding sampling interval, wherein $S_{-2}$ is the digital signal sample received two sampling intervals before the current sampling interval, wherein $S_{-3}$ is the digital signal sample received three sampling intervals before the current sampling interval, and wherein $S_{-(n-1)}$ is the digital signal sample received n−1 sampling intervals before the current sampling interval;

ii) a plurality of multipliers, each such multiplier multiplying digital signal sample $S_0$ by one of digital signal samples $S_{-1}, S_{-2}, S_{-3}, \ldots, S_{-(n-1)}$ to produce a corresponding product;

iii) a plurality of accumulators, each accumulator being coupled to a corresponding one of the plurality of multipliers for accumulating the products produced thereby over a series of sampling intervals to generate corresponding accumulated sums;

iv) storage for storing the accumulated sums generated by the plurality of accumulators, said storage including storage locations for storing in memory normal accumulated sums generated during known periods when the monitored space is not disturbed;

d) the digital signal processor comparing currently generated accumulated sums to previously stored normal accumulated sums generated during known periods when the monitored space was not disturbed, and generating an alarm signal when the current values for the accumulated sums do not correspond to normal accumulated sums previously stored during at least one known period when the monitored space was not disturbed.

2. The system recited by claim 1 wherein the transducer is a microphone.

3. The system recited by claim 1 wherein the digital signal processor samples between 100 digital signals per second and 5,000 digital signals per second.

4. The system recited by claim 1 wherein the digital signal processor stores at least 100 digital signal samples $S_0, S_{-1}, S_{-2}, S_{-3}, \ldots, S_{-(99)}$.

5. The system recited by claim 1 wherein each accumulator includes an adder for combining the product of the corresponding multiplier and the accumulated sum generated by the corresponding accumulator during the immediately preceding sampling interval.

6. The system recited by claim 5 wherein each adder includes an attenuator to attenuate the accumulated sum to prevent the accumulated sum from increasing infinitely.

7. The system recited by claim 1 further including a wireless transmitter for transmitting the alarm signal to a receiver.

8. The system recited by claim 1 further including:
a) a second transducer disposed within the monitored space for creating a second analog electrical signal in response to audio signals within the monitored space;
b) a second analog-to-digital converter coupled to the second transducer and generating a second digital signal corresponding to the analog electrical signal currently created by the second transducer;
c) the digital signal processor having a second input coupled to the second analog-to-digital converter for receiving the second digital signal generated by the second analog-to-digital converter, the digital signal processor providing:
i) storage for storing n second digital signal samples $S2_0, S2_{-1}, S2_{-2}, S2_{-3}, \ldots, S2_{-(n-1)}$ corresponding to second digital signals received by the digital signal processor during a most recent n periodic sampling intervals, wherein n is an integer greater than 50, wherein $S2_0$ is the second digital signal sample received during a current sampling interval, wherein $S2_{-1}$ is the second digital signal sample received during an immediately preceding sampling interval, wherein $S2_{-2}$ is the second digital signal sample received two sampling intervals before the current sampling interval, wherein $S2_{-3}$ is the second digital signal sample received three sampling intervals before the current sampling interval, and wherein $S2_{-(n-1)}$ is the second digital signal sample received n−1 sampling intervals before the current sampling interval;

ii) a second plurality of multipliers, each such second multiplier multiplying the second digital signal sample $S_0$ by one of second digital signal samples $S2_{-1}, S2_{-2}, S2_{-3}, \ldots, S2_{-(-1)}$ to produce a corresponding second product;

iii) a second plurality of accumulators, each accumulator being coupled to a corresponding one of the second plurality of multipliers for accumulating the second products produced thereby over a series of sampling intervals to generate corresponding second accumulated sums;

iv) storage for storing the second accumulated sums generated by the second plurality of accumulators, the digital signal processor storing in memory the second accumulated sums generated during known periods when the monitored space is not disturbed;

d) the digital signal processor comparing currently generated second accumulated sums to previously stored second accumulated sums generated during known periods when the monitored space was not disturbed, and generating an alarm signal when the current values for the second accumulated sums do not substantially correspond to second accumulated sums previously stored during at least one known period when the monitored space was not disturbed.

9. A method of detecting a disturbance within a monitored space, comprising the steps of:
a) providing a transducer within the monitored space for converting audio signals into analog electrical signals;
b) converting the analog electrical signals into corresponding digital signals;
c) receiving a current digital signal sample $S_0$ at periodic sampling intervals;
d) storing n digital signal samples $S_0, S_{-1}, S_{-2}, S_{-3}, \ldots, S_{-(n-1)}$ corresponding to the digital signals received during the most recent n periodic sampling intervals, wherein n is an integer greater than 50, wherein $S_0$ is the digital signal sample received during a current sampling interval, wherein $S_{-1}$ is the digital signal sample received one sampling interval before, wherein $S_{-2}$ is the digital signal sample received two sampling intervals before, wherein $S_{-3}$ is the digital signal sample received three sampling intervals before, and wherein $S_{-(n-1)}$ is the digital signal sample received n−1 sampling intervals before;
e) multiplying digital signal sample $S_0$ by at least one of digital signal samples $S_{-1}, S_{-2}, S_{-3}, \ldots, S_{-(n-1)}$ and accumulating the product of such multiplication in a first accumulator over a plurality of periodic sampling intervals to produce a first accumulated sum;
f) multiplying digital signal sample $S_0$ by at least another of digital signal samples $S_{-1}, S_{-2}, S_{-3}, \ldots, S_{-(n-1)}$ and accumulating the product of such multiplication in a second accumulator over a plurality of periodic sampling intervals to produce a second accumulated sum;
g) storing values for the first and second accumulated sums obtained when the monitored space is not disturbed;
h) comparing current values for the first and second accumulated sums to the stored values for the first and second accumulated sums; and i) creating an alarm signal when the current values for the first and second accumulated sums do not correspond to values stored in step g).

10. The method recited by claim 9 wherein the transducer is a microphone.

11. The method recited by claim 9 wherein the step of receiving a current digital signal sample $S_0$ at periodic sampling intervals is performed at a rate of between 100 digital signals per second and 5,000 digital signals per second.

12. The method recited by claim 9 wherein the step of storing n digital signal samples includes storing at least 100 digital signal samples $S_0, S_{-1}, S_{-2}, S_{-3}, \ldots, S_{-(99)}$.

13. The method recited by claim 9 wherein, within step e), the step of accumulating the product of such multiplication in a first accumulator over a plurality of periodic sampling intervals to produce a first accumulated sum includes the steps of:

combining the multiplication product with the current value of the first accumulated sum in the first accumulator to generate an updated accumulated sum for the first accumulator; and storing the updated first accumulated sum in the first accumulator.

14. The method recited by claim 13 wherein the combining step includes the step of attenuating the first accumulated sum to prevent the accumulated sum from increasing infinitely.

15. The method recited by claim 9 wherein the step of creating an alarm signal includes the step of wirelessly-transmitting the alarm signal to a receiver.

16. The method recited by claim 9 further including the further steps of:

j) providing a second transducer within the monitored space for converting audio signals into second analog electrical signals;

k) converting the second analog electrical signals into corresponding second digital signals; and l) receiving a current second digital signal sample $S2_0$ at periodic sampling intervals;

m) storing n second digital signal samples $S2_0, S2_{-1}, S2_{-2}, S2_{-3}, \ldots, S2_{(n-1)}$ corresponding to the second digital signals received during the most recent n periodic sampling intervals, wherein n is an integer greater than 50, wherein $S2_0$ is the second digital signal sample received during a current sampling interval, wherein $S2_{-1}$ is the second digital signal sample received one sampling interval before, wherein $S2_{-2}$ is the second digital signal sample received two sampling intervals before, wherein $S2_{-3}$ is the second digital signal sample received three sampling intervals before, and wherein $S2_{(n-1)}$ is the second digital signal sample received n−1 sampling intervals before;

n) multiplying second digital signal sample $S2_0$ by at least one of second digital signal samples $S2_{-1}, S2_{-2}, S2_{-3}, \ldots, S2_{(n-1)}$ and accumulating the product of such multiplication in a first accumulator over a plurality of periodic sampling intervals to produce a first accumulated sum;

o) multiplying second digital signal sample $S2_0$ by at least another of second digital signal samples $S2_{-1}, S2_{-2}, S2_{-3}, \ldots, S2_{(n-1)}$ and accumulating the product of such multiplication in a second accumulator over a plurality of periodic sampling intervals to produce a second accumulated sum;

p) storing values for the first and second accumulated sums obtained when the monitored space is not disturbed;

q) comparing current values for the first and second accumulated sums to the stored values for the first and second accumulated sums; and r) creating an alarm signal when the current values for the first and second accumulated sums do not correspond to values stored in step p).

\* \* \* \* \*